United States Patent [19]

Sheets

[11] 4,176,248
[45] Nov. 27, 1979

[54] SYSTEM FOR IDENTIFYING AND CORRECTING THE POLARITY OF A DATA SIGNAL

[75] Inventor: Laurence L. Sheets, Atkinson, N.H.

[73] Assignee: Bell Telephone Laboratories, Incorporated, Murray Hill, N.J.

[21] Appl. No.: 863,870

[22] Filed: Dec. 23, 1977

[51] Int. Cl.² .............................................. H04L 1/00
[52] U.S. Cl. ...................................... 178/67; 361/246; 307/262; 307/236
[58] Field of Search ........ 179/15 AL, 15 BA, 15 BC, 179/15 BY; 325/38 R, 43, 44, 59, 60, 323, 54; 178/66 R, 67, 69 D; 343/200, 203; 307/236, 262; 361/245, 246; 358/133, 141

[56] References Cited
U.S. PATENT DOCUMENTS

| | | | |
|---|---|---|---|
| 2,820,181 | 1/1958 | Bowman et al. | 317/8 |
| 3,202,762 | 8/1965 | Aaron et al. | 179/15 BA |
| 3,261,919 | 7/1966 | Aaron et al. | 179/15 BA |
| 3,543,050 | 11/1970 | Paine | 307/235 |
| 3,548,107 | 12/1970 | Webb | 179/15 |
| 3,751,596 | 8/1973 | Tseng | 179/15 BC |
| 4,051,438 | 9/1977 | Pickett et al. | 343/200 X |

*Primary Examiner*—Benedict V. Safourek
*Attorney, Agent, or Firm*—Joseph A. Cameron

[57] ABSTRACT

A very low power asymmetrical polarity marking signal which may be the sum of a cosine wave and its coherent second harmonic is added to a symmetrical message signal before transmission. At the receive the polarity information may be recovered from the average dc value of the positive and negative peaks of the polarity signal or from the coincidence of peaks of the fundamental and second harmonic components.

10 Claims, 6 Drawing Figures

SYSTEM FOR IDENTIFYING AND CORRECTING THE POLARITY OF A DATA SIGNAL

BACKGROUND OF THE INVENTION

This invention relates to the field of digital transmission.

In long distance transmission systems, where a typical transmission path may include a considerable number of switches and patch connections, including automatic protection switching to standby facilities, the transmitted signal can be too easily inverted. That is, in telephone parlance, the tip and ring connections can be easily reversed. For many signals such as analog voice signals, reversal is not serious because the signal is totally symmetrical. For other signals, such as television signals, the signal is polarized, but the polarity can be recognized because of asymmetrical characteristics of the signal itself. U.S. Pat. No. 2,820,181, which issued Jan. 14, 1958 to B. M. Bowman et al., describes a circuit for detecting and correcting the polarity of a television signal.

Digital signals, on the other hand, often have symmetrical waveforms for transmission, but their sensitivity to tip-ring reversals depends upon their particular decoding algorithms. Some efficient digital coding schemes such as Class IV (partial response) coding produce a symmetrical voltage waveform for transmission but use an unsymmetrical decoding algorithm. Such coding schemes, therefore, require an uninverted signal for correct decoding, even though the polarity of the signal itself is not recognizable.

An object of this invention is to identify the polarity of a transmitted digital signal, through the addition of a polarity signal.

A second object is to correct the polarity of a received inverted digital signal.

Polarity signals added to a digital signal would normally require extra bandwidth in order to avoid interfering with the digital signal.

A third object of this invention is to add a polarity signal to a digital signal without increasing the transmission bandwidth and without interfering with the digital signal.

SUMMARY OF THE INVENTION

An asymmetrical polarity signal, which may be of the form $v_p = A(\cos \omega_0 t + B \cos 2\omega_0 t)$ is added to the data message signal before transmitting. At the receiver, the polarity signal is separated from the message signal, and positive and negative peaks are averaged to recover the polarity information. Alternatively, the polarity information may be recovered from the coincidence of peaks of the polarity signal components. The polarity information may be used to operate a relay to correct an inverted data message signal automatically.

DETAILED DESCRIPTION

In order to be most useful, a polarity signal to be added to a digital message signal before transmitting should have several attributes:

1. It must be unsymmetrical about zero volts;
2. It must not interfere with the digital signal so as to impede message recovery;
3. It should occupy a very limited band so as to not require additional frequency allocation or information bits stolen from the bit stream;
4. It should be simple and inexpensive to generate and detect.

Figure 1:
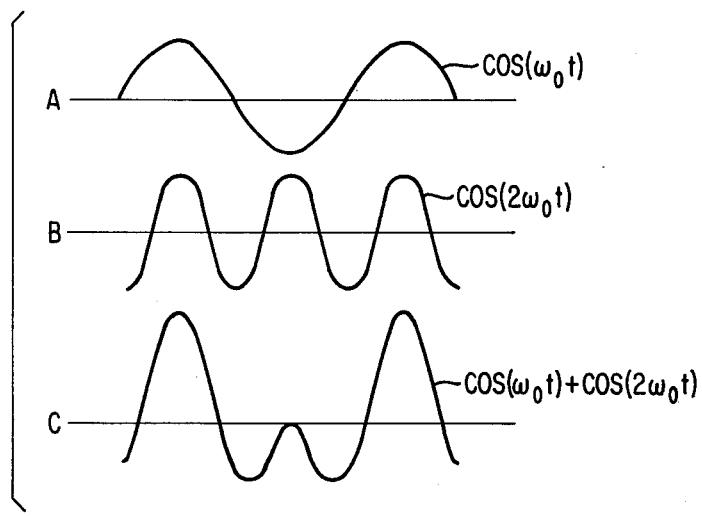
FIG. 1 is a series of volt-time plots illustrating the generation of a polarity signal useful in practicing the invention.

One type of asymmetrical signal which has all of these attributes when used as a polarity signal according to the principles of this invention is the sum of a cosine and its coherent second harmonic; it may be expressed: $v = A(\cos \omega_0 t + B \cos 2\omega_0 t)$. The three curves of FIG. 1 illustrate the characteristics of this particularly useful polarity signal. They are plotted for $B = 1$.

Curve A is a simple sine wave, $v = \cos \omega_0 t$;

Curve B is the easily generated second harmonic of curve A, $v = \cos 2\omega_0 t$;

Curve C is the polarity signal $v = \cos \omega_0 t + \cos 2\omega_0 t$ which results when the signals of Curves A and B are added together.

Because the polarity signal occupies a bandwidth of only one octave, it may be added to the digital message signal in a part of the frequency spectrum occupied by very little data signal energy. In the Bell System Data Under Voice (DUV) signal, very little energy occupies the band from 0 to 5 KHz. A fundamental tone of 1,500 Hz added to its 3,000 Hz second harmonic produces a polarity signal which can be added to the DUV data signal without interference. The amplitude of the polarity signal must, of course, be less than one half the amplitude of the digital message bits, that is, less than the eye height. The polarity signal thus occupies frequency and amplitude space in the allowable noise band.

The asymmetry of the polarity signal, which allows recovery of the polarity information by positive and negative peak averaging, is easily seen. If the amplitudes of the $\omega_0$ and $2\omega_0$ components are equal, and their positive peaks are exactly in phase, the amplitude of the positive peaks of the composite polarity signal is 1.78 times the negative peak amplitude. Since most common noise is symmetrical, the polarity information can be recovered from considerable noise by the peak averaging method. It should be noted, however, that the relative phases of the fundamental signal of Curve A and its second harmonic Curve B are important to the generation of the polarity signal of Curve C. If the second harmonic component is shifted by 90 degrees in either direction, the composite polarity signal becomes symmetrical, and the polarity information is lost. This has two important ramifications. First, the frequency of this polarity signal should be kept well above the low frequency cut-off point of the transmission system to avoid a severe phase shift of the second harmonic relative to the fundamental component. On a 120 Hz to 386 KHz system the two frequencies 1500 Hz and 3000 Hz operate satisfactorily. Second, and perhaps more challenging, the necessary phase relationship makes possible digital detection of the polarity information, even in the presence of a great deal of noise.

Figure 2:
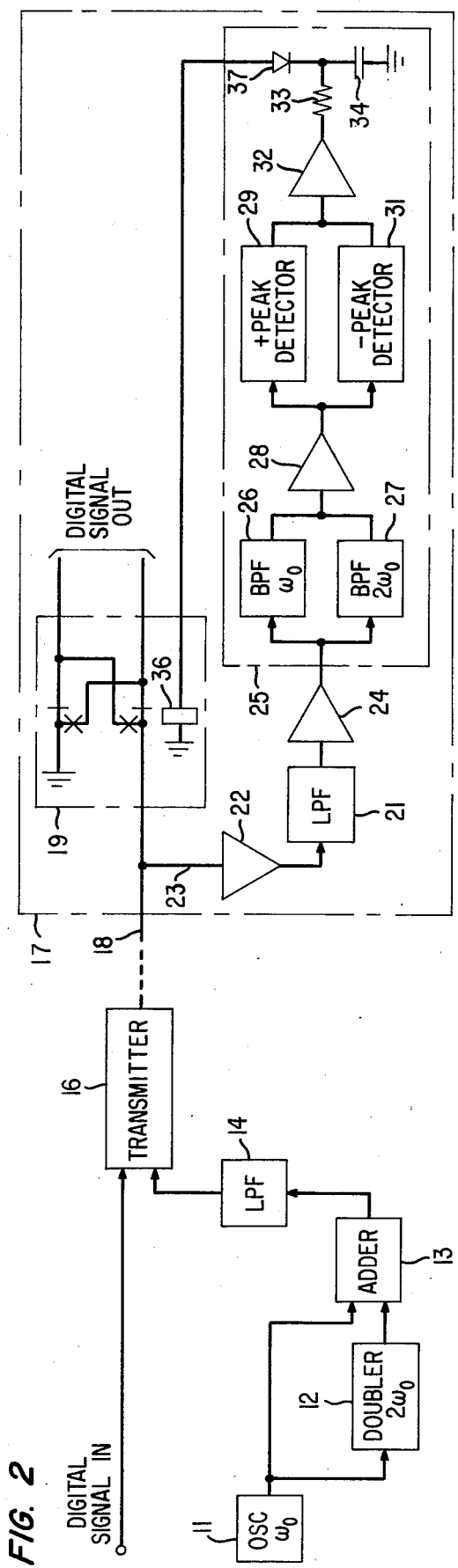
FIG. 2 is a partly block, partly schematic diagram of a useful embodiment of the invention.

An embodiment of the invention using the polarity signal of FIG. 1 is shown in block form in FIG. 2. An oscillator 11 generates a fundamental sine wave having a frequency $\omega_0$. A frequency doubler 12 connected to the output of oscillator 11 generates a sine wave having the frequency $2\omega_0$. The outputs of oscillator 11 and frequency doubler 12 are combined in an adder 13 to generate the composite polarity signal. A low pass filter 14 connected to the output of adder 13 removes all higher harmonics. The digital message signal and the polarity signal from the low pass filter 14 are both fed to transmitter 16 for transmission by any standard medium to receiver 17.

In analog receiver 17 the digital message signal and polarity signal are fed along conductor 18 to a reversing relay 19. A low pass filter 21 is connected to conductor 18 via a buffer amplifier 22 and tap 23. Low pass filter 21 serves to separate the polarity signal from the digital message signal. A splitting amplifier 24 connected to the low pass filter 21 splits the polarity signal into two paths for use by analog polarity detector circuit 25. The first path leads to a bandpass filter 26 tuned to the frequency $\omega_0$; the second path leads to a bandpass filter 27 tuned to the second harmonic frequency $2\omega_0$. The outputs of filters 26 and 27 are then combined in a summing amplifier 28. The separate filtering and re-combining of the $\omega_0$ and $2\omega_0$ components of the polarity signal, although not necessary to the practice of the invention, serves to purify the received polarity signal so that its polarity information may be more readily detected. The output of summing amplifier 28 is fed simultaneously to a positive peak detector 29 and a negative peak detector 31. The outputs of detectors 29 and 31 are combined in a summing amplifier 32 and fed to an averaging circuit, which may comprise simply a resistor 33 and a capacitor 34. The coil 36 of reversing relay 19 is connected to the averaging circuit through a diode 37.

The output of summing amplifier 28 is the recovered polarity signal, which will have the same polarity as the received digital message signal. As previously pointed out, if the amplitudes of the $\omega_0$ and $2\omega_0$ components are equal, although the energy of the polarity signal is the same in each half cycle, the positive peaks will be approximately 1.78 times the amplitude of the negative peaks. If the average of the positive and negative peaks appearing at the junction of resistor 33 and capacitor 34 is positive, therefore, relay coil 36 is blocked by diode 37 and relay 19 does not operate. If the digital signal and hence the polarity signal are inverted, however, capacitor 34 will charge up negative, forward biasing diode 37 and causing relay 19 to operate. The digital message signal out of relay 19 is therefore correct for use by the data signal terminal.

Figure 3:
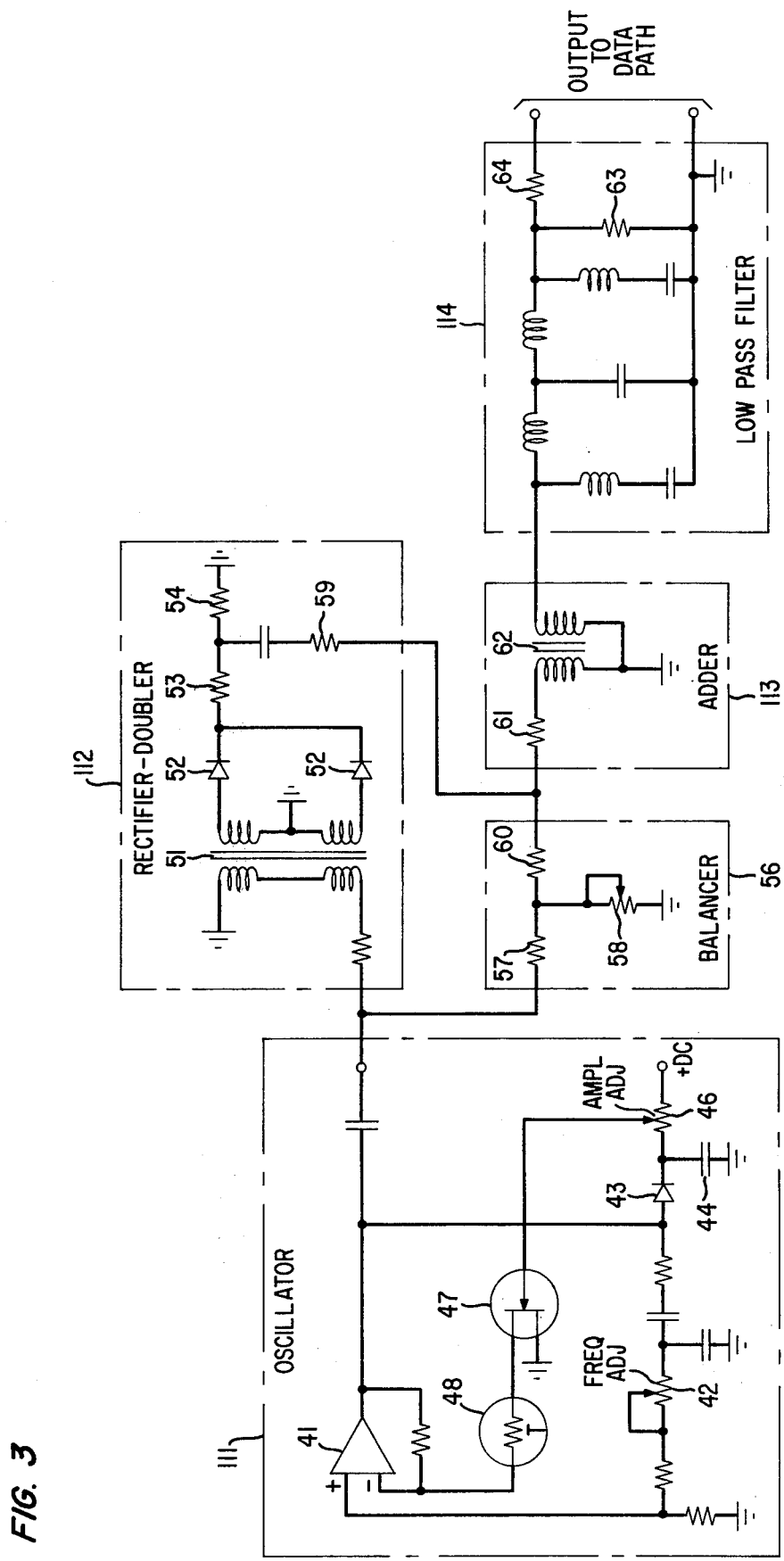
FIG. 3 is a schematic diagram of a polarity signal generator for producing the polarity signal of FIG. 1.

A particularly useful circuit for generating the polarity signal of FIG. 1 is shown in the schematic diagram of FIG. 3. The purpose of oscillator 111 is to generate a sine wave at $\omega_0$ frequency with a constant amplitude. According to one known alternative, oscillator 111 may include an operational amplifier 41 with an RC feedback loop. The value of a resistance 42 in the feedback loop may be varied to provide frequency control. In order to stabilize the output amplitude of the oscillator, another feedback circuit may include a diode 43 and a capacitor 44 connected in series between the output of operational amplifier 41 and ground to provide a dc voltage proportional to the oscillation amplitude. A potentiometer 46 may be connected between capacitor 44 and a source of bias potential. The wiper arm of potentiometer 46 may be connected to the gate of a field effect transistor 47, the source of which is connected through a thermistor 48 to the reversing input of operational amplifier 41. The drain of field effect transistor 47 may be grounded. The output amplitude of the oscillator is thereby limited by dc feedback to minimize the generation of harmonics. Thermistor 48 is helpful in complementing the temperature characteristics of transistor 47. Potentiometer 46, of course, provides an adjustment for oscillator output amplitude.

Frequency doubler 112 may advantageously take the form of a full wave rectifier to also limit the generation of higher harmonics. The primary winding of a transformer 51 is connected to the output of oscillator 111. Individual diodes 52 are connected to each end terminal of the center-tapped secondary winding of transformer 51, and the center-tap is grounded to provide a balanced full wave rectified output. A pair of resistors 53 and 54, connected in series between diodes 52 and ground, act as a voltage divider to reduce the output of doubler 112. The relative outputs of oscillator 111 and frequency doubler 112 are balanced in the proper quantities by the action of a balancing circuit 56. Series resistance 57 and shunt adjustable resistance 58 form a variable voltage divider. The oscillator and doubler outputs are combined in a summing junction formed by resistors 59, 60, and 61. In addition to the summing junction, adder 113 may advantageously include a transformer 62 to match impedances so that the capacitive and inductive components of low pass filter 114 are practical values attainable in a reasonable size. The output of low pass filter 114 includes a voltage divider made up of resistors 63 and 64 to set the output level of the polarity signal for combining with the digital message signal at the transmitter. The power of the polarity signal may be set as low as 40 to 50 db below the message signal power so as to not effect the error rate, and still be detected.

Figure 4:
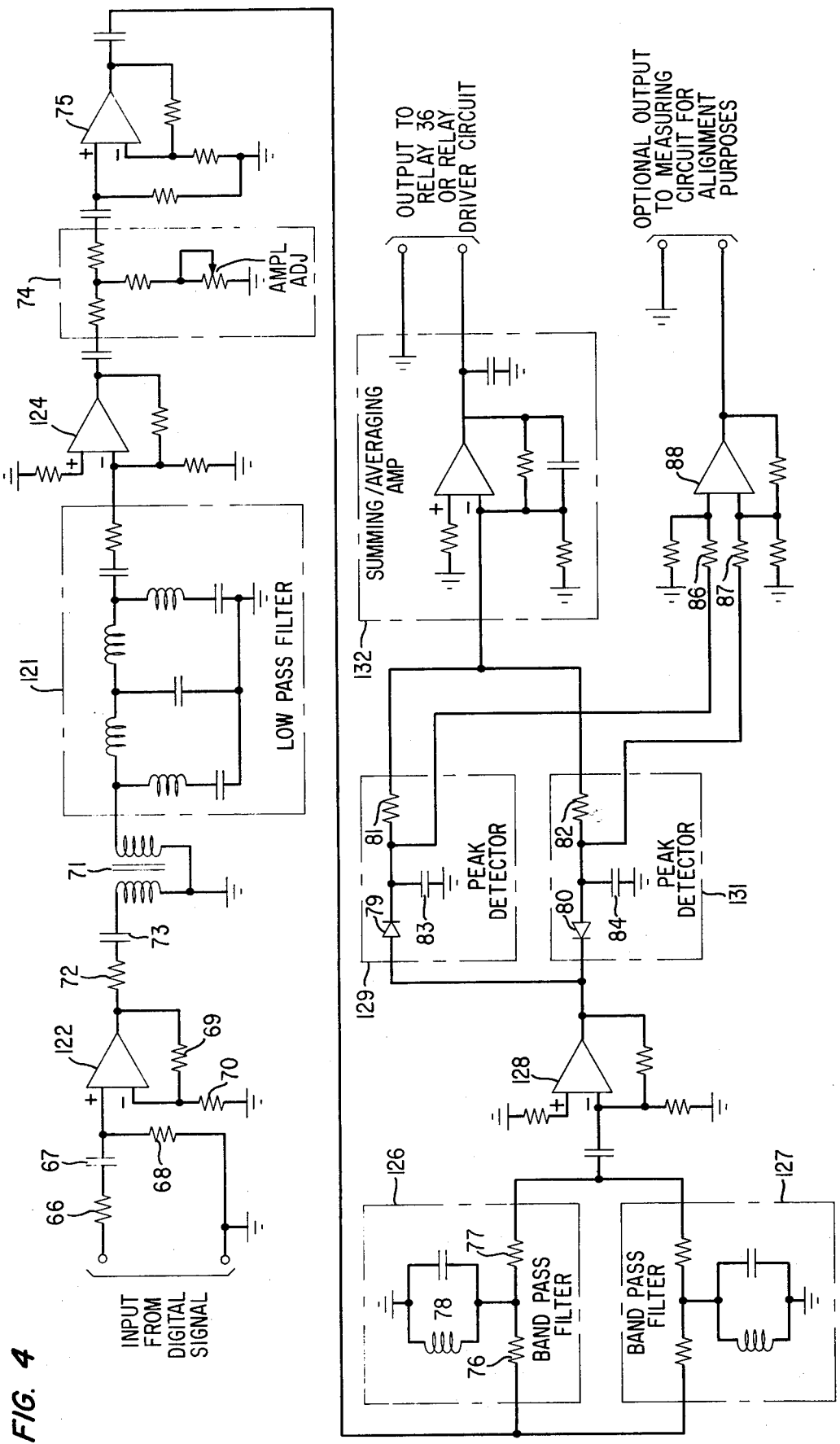
FIG. 4 is a schematic diagram of a polarity signal detector useful in practicing the invention.

A receiver of the peak averaging type for recovering the polarity information from the received composite signal is shown in the schematic diagram of FIG. 4. An amplifier 122 is connected to the digital path via a resistor 66 and coupling capacitor 67. Resistor 66 may typically be of a high resistance value to minimize any effect on the digital message receiving circuit. A resistor 68 may shunt the input of amplifier 122 to properly match the amplifier input impedance. The gain and output impedance of amplifier 122 are determined, according to well known design practice, by the values chosen for feedback resistor 69 and shunt resistor 70, respectively.

Transformer 71 couples the output of amplifier 122 to low pass filter 121 via resistor 72 and coupling capacitor 73. Low pass filter 121, like filter 114, is of standard construction familiar to those skilled in the art. Transformer 71 is used to match impedances between filter 121 and amplifier 122 so that each may be designed at its most convenient impedance level. The output of filter 121 is delivered to bandpass filters 126 and 127 via amplifiers 124 and 75. A simple resistive T amplitude adjusting network 74 may be conveniently inserted between amplifiers.

Bandpass filters 126 and 127 are also straight-forward, easily designed T networks. The LC network 78 connected from the junction between resistor 76 and 77 to ground, for example, is parallel tuned to the frequency $\omega_0$, and therefore shunts to ground all frequencies except $\omega_0$. It thus operates to pass to amplifier 128 only the fundamental frequency $\omega_0$. Bandpass filter 127 operates in a similar manner to pass frequency $2\omega_0$.

The outputs of filters 126 and 127, that is, the recovered $\cos \omega_0 t$ and $\cos 2\omega_0 t$ signals, are combined and coupled to amplifier 128. The output of amplifier 128, therefore, contains only the polarity signal which was added to the data signal before transmission. This recovered polarity signal is delivered to peak detectors 129 and 131. Each peak detector may comprise a series combination of a diode 79, 80 and a resistor 81, 82 with a capacitor 83, 84 connected from the junction between the diode and resistor to ground. Diodes 79 and 80 are poled in opposite directions in order to detect both positive and negative peaks. Capacitor 83 charges to the peak positive voltage and capacitor 84 to the peak negative voltage of the recovered polarity signal. Since, as was previously discussed, the peak voltage of one polarity will be greater than that of the other (in case of equal amplitude components $\omega_0$ and $2\omega_0$ and zero relative phase shift the ratio is 1.78 to 1), one capacitor will charge to a higher voltage than the other. The outputs of both peak detectors are combined and delivered to the reversing input of summing amplifier 132, where they are averaged. If the average is positive, indicating a correct polarity message signal, the output of summing amplifier 132 is negative, and the polarity correcting relay (19 in FIG. 2) will not operate. If the average of the dc signals out of the peak detectors is negative, of course, relay 19 will operate, automatically correcting the polarity of the received message signal for proper decoding. The output of peak detectors 129 and 131 may also be delivered through isolating resistors 86 and 87 to a differential amplifier 88, producing an output proportional to the sum of the magnitude of the detected peaks. This optional measuring circuit is useful in aligning the polarity circuit for optimum polarity discrimination. Normally, the very low amplitude of the received polarity signal will preclude any interference with the message signal. In critical situations, however, the output of amplifier 28 may be applied through proper amplitude and phase adjusting networks in a well known manner to cancel the polarity signal entirely from the message signal so that it provides virtually no contribution to the system noise.

Figure 5:
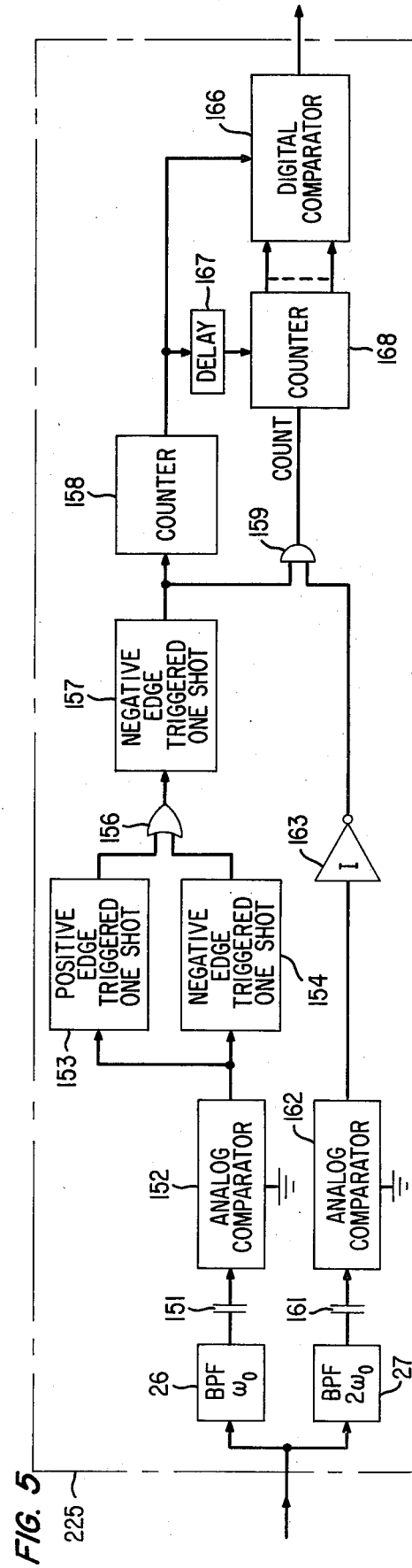
FIG. 5 is a block diagram of an alternate polarity signal detector useful in practicing the invention.

As previously mentioned, the polarity information can also advantageously be detected from the recovered polarity signal by digital methods. It will be recognized that the positive peaks of the fundamental component are always coincidental with the positive peaks of the second harmonic component. The converse is not true, nor is the same true of negative peaks. A particularly useful digital polarity information detector circuit which capitalizes on these facts is shown in FIG. 5. Digital polarity information detector 225 of FIG. 5 may be substituted for analog polarity information detector 25 of FIG. 2. In FIG. 5, the output of $\omega_0$ bandpass filter 26 is connected via a coupling capacitor 151 to an analog zero voltage comparator 152. The output of comparator 152 is led simultaneously to a positive-edge-triggered one shot flip flop 153 and a negative-edge-triggered one shot flip flop 154. The outputs of flip flops 153 and 154 are connected to respective inputs of an OR gate 156, which in turn feeds another negative-edge-triggered one shot flip flop 157. The output of flip flop 157 is divided into two paths, the first path feeds a counter 158 and the second path one input of an AND gate 159. The other input of AND gate 159 is connected to the output of the $2\omega_0$ bandpass filter 27 via a coupling capacitor 161, an analog zero comparator 162 and an inverter 163. The output of AND gate 159 feeds a counter 164, which in turn feeds a digital comparator 166. The output of downcounter 158 strobes digital comparator 166 and, through a delay, counter 164.

Figure 6:
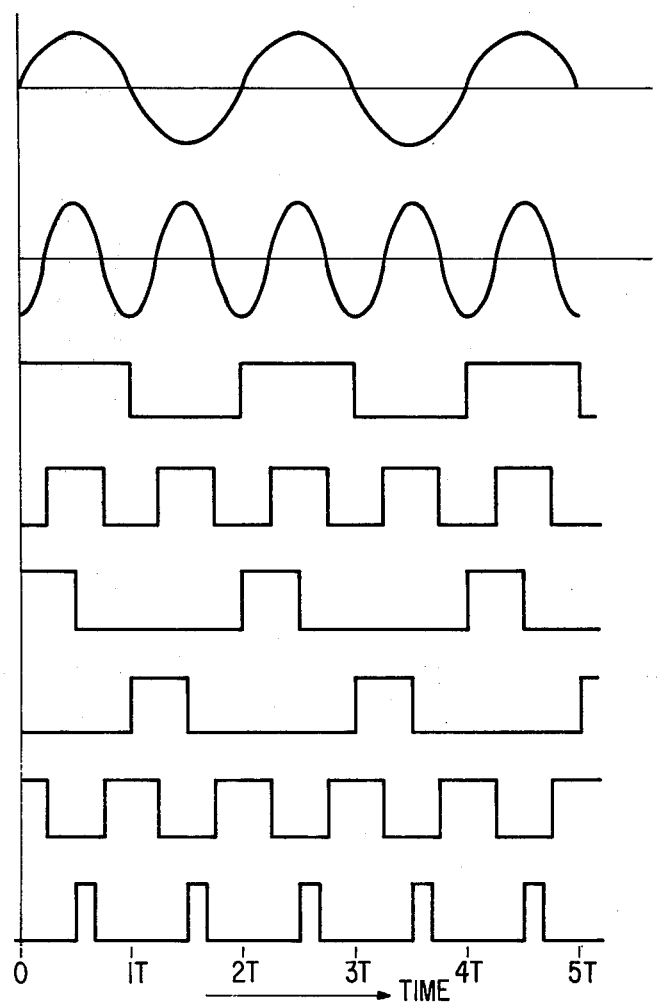
FIG. 6 is a series of volt-time plots useful in understanding the operation of the polarity signal detector of FIG. 5.

The operation of the polarity information detector of FIG. 5 may be readily understood in reference to the volt-time plots of FIG. 6. Each time plot may be observed at the output of the component whose identification number is the same as the curve number. The sine curve 151 is therefore the volt-time curve of the fundamental component $\cos \omega_0$ as seen at the output of capacitor 151, etc. Analog zero comparator 152 squares up the fundamental signal and flip flops 153 and 154 produce output signals illustrated by curves 153 and 154, respectively. The "ON" time of both one shot flip flops 153 and 154 may advantageously be equal to T/2; that is, one half the period of the second harmonic wave form $\cos 2\omega_0$. OR gate 156 effectively applies both signals 153 and 154 to one shot 157 of short "ON" time to produce the clock signal of curve 157, the period of which is identical to that of the recovered second harmonic component. Moreover, if the polarity signal is not inverted, the clock signal 157 is coincident with the positive peaks of the recovered second harmonic component. When the second harmonic component is squared by comparator 162 and inverted by inverter 163, therefore, any positive signal coincidence with the clock signal 157 is passed by AND gate 159 and is an indication that the polarity signal is inverted. The output of AND gate 159 therefore may be used to drive polarity correcting relay 19.

The remainder of the circuit of FIG. 5 amounts to an optional digital noise filter. The error indications at the output of AND gate 159 are counted in counter 164. Counter 158 serves to divide the clock signal by a rational number to provide periodic pulses to strobe digital comparator 166 and reset counter 164. A short delay, which may be provided by a series of gates, 167 for instance, delays resetting the counter until the digital comparator is strobed. Pre-stored in digital comparator 166 is the number of acceptable errors within the time period between strobe pulses from counter 158. The noise filter in FIG. 5, therefore allows determination of the polarity of the received signal on an average basis and greatly improves performance in the presence of a considerable amount of noise.

According to the principles of the invention therefore, an asymmetrical polarity signal may be easily generated and added to the digital message signal before transmission. It may be of low power and very narrow bandwidth so as to require no additional allocated bandwidth to transmit and yet not interfere with the digital message signal, and it may be easily detected by both analog and digital means.

While I have set forth herein the best modes currently contemplated for practicing the invention, it will be obvious to those skilled in the art that many other uses and embodiments of my invention can be devised without departing from the spirit and scope of the invention. It will be readily recognized, for example, that an asymmetrical polarity marking signal may be usefully applied to an analog message signal as well as a digital one, and that it may also do double duty by serving as a baseband pilot signal for automatic gain control. It will be further recognized that other generating and detecting circuits can be devised to practice the invention.

What is claimed is:

1. A method for identifying the polarity of a transmitted message signal comprising the steps of (1) generating an asymmetrical signal, (2) adding said asymmetrical signal to said message signal before transmission to mark the polarity of said message signal, and (3) detecting the polarity of said asymmetrical signal after transmission to identify the polarity of said transmitted message signal.

2. The method as in claim 1 wherein said asymmetrical signal comprises the sum of a cosine waveform and its coherent second harmonic.

3. A digital transmission system for transmitting a multi-level digital signal between a transmitting means and a receiving means comprising polarity signal generating means for generating an asymmetrical signal of frequency $\omega_0$ substantially described by the equation $vp = A(\cos \omega_0 t + B \cos 2\omega_0 t)$, wherein vp is the instantaneous polarity signal voltage, A is a scaling factor and B is a proportionality constant; combining means connected between said generating and said transmitting means for adding said polarity signal to said digital signal to mark the polarity of said digital signal; and detecting means connected to said receiving means for detecting the polarity of said asymmetrical polarity signal.

4. A digital transmission system as in claim 3 wherein the proportionality constant b is substantially equal to one.

5. A transmission system as in claim 3 wherein said generating means comprises an oscillator for generating a cosine waveform of frequency $\omega_0$ a full wave rectifier coupled to the output of said oscillator, combining means coupled to said oscillator and said rectifier for combining the outputs of said oscillator and rectifier and low pass filter means coupled to the output of said combining means for removing therefrom harmonics of $\omega_0$ higher than the second harmonic.

6. A transmission system as in claim 3 wherein said detecting means comprises a positive peak detector having an output proportional to the amplitude of the positive peaks of said received polarity signal, a negative peak detector having an output proportional to the amplitude of the negative peaks of said received polarity signal and averaging means connected to said peak detectors for producing an output signal indicative of the polarity of the greater of said peak amplitudes.

7. A transmission system as in claim 3 wherein said detecting means comprises first bandpass filter means tuned to frequency $\omega_0$ to pass the fundamental component of said polarity signal, second bandpass filter means tuned to frequency $2\omega_0$ to pass the second harmonic component of said polarity signal, and peak coincidence means connected to said first and second filter means for indicating the coincidence of peaks of the same polarity of said fundamental and second harmonic components.

8. A transmission system as in claim 3 comprising polarity correcting means responsive to said detecting means for correcting the polarity of a received inverted digital signal.

9. A polarity detector for detecting the polarity of a received composite signal containing a message signal and an asymmetrical polarity signal, said asymmetrical polarity signal having a fundamental frequency component and a second harmonic frequency component, said polarity detector comprising input means for receiving said composite signal, a first bandpass filter connected to said input means for passing said fundamental component, a second bandpass filter connected to said input means for passing said second harmonic component, first and second squaring means connected to said first and second bandpass filters, respectively, for squaring the respective waveforms of said fundamental and said second harmonic components, a first one-shot flip flop connected to said first squaring means for producing a pulse of predetermined duration in response to a positive-going edge of said squared fundamental component waveform, a second one-shot flip flop connected to said first squaring means for producing a pulse of predetermined duration in response to a negative-going edge of said squared fundamental component waveform, a third one-shot flip flop connected to said first and second flip flops for producing a pulse of predetermined duration in response to the termination of a pulse from said first and second flip flops, respectively, and gating means connected to said third flip flop and said second squaring means for emitting a pulse in response to a pulse emitted from said third flip flop while the squared second harmonic component is of a given polarity.

10. A polarity detector as in claim 9 comprising a first counter connected to said gating means for counting the pulses emitted therefrom, a digital comparator connected to said first counter for indicating when the count therein exceeds a predetermined number, and a second counter having an input connected to said third flip flop and an output connected to said digital comparator and through delay means to said first counter for resetting said digital comparator and said first counter after a predetermined number of pulses from third flip flop.

* * * * *